United States Patent [19]
Funk et al.

[11] Patent Number: 6,059,185
[45] Date of Patent: *May 9, 2000

[54] AUTOMATED SYSTEM AND METHOD FOR IMPROVED CHECK PROCESSING

[75] Inventors: Wade L. Funk, Plano; Walter C. Jackson, Carrollton, both of Tex.

[73] Assignee: Electronic Data Systems Corporation, Plano, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/623,480

[22] Filed: Mar. 28, 1996

[51] Int. Cl.$^7$ ..................................................... G06F 15/30
[52] U.S. Cl. ........................................... 235/379; 235/375
[58] Field of Search .................................. 235/380, 379, 235/375

[56] References Cited

U.S. PATENT DOCUMENTS

| | | | |
|---|---|---|---|
| 4,015,701 | 4/1977 | Templeton | 197/127 R |
| 4,027,142 | 5/1977 | Paup et al. | 235/61.9 R |
| 4,109,238 | 8/1978 | Creekmore | 340/149 A |
| 4,201,978 | 5/1980 | Nally | 340/146.3 |
| 4,277,689 | 7/1981 | Thomas et al. | 250/567 |
| 4,404,649 | 9/1983 | Nunley et al. | 364/900 |
| 4,523,330 | 6/1985 | Cain | 382/7 |
| 4,617,457 | 10/1986 | Granzow et al. | 235/379 |
| 4,672,377 | 6/1987 | Murphy et al. | 340/825.34 |
| 4,678,895 | 7/1987 | Tateisi et al. | 235/379 |
| 4,727,243 | 2/1988 | Savar | 235/379 |
| 4,810,866 | 3/1989 | Lord, Jr. | 235/379 |
| 4,891,503 | 1/1990 | Jewell | 235/380 |
| 5,053,607 | 10/1991 | Carlson et al. | 235/379 |
| 5,054,092 | 10/1991 | LaCaze | 382/11 |
| 5,245,164 | 9/1993 | Oyama | 235/379 |
| 5,253,345 | 10/1993 | Fernandes et al. | 395/275 |
| 5,310,997 | 5/1994 | Roach et al. | 235/375 |
| 5,327,508 | 7/1994 | Deaton et al. | 382/7 |
| 5,351,994 | 10/1994 | Pollin | 283/117 |

FOREIGN PATENT DOCUMENTS

| | | | |
|---|---|---|---|
| WO 84/02212 | 6/1984 | WIPO | G06F 15/21 |
| WO 89/00318 | 1/1989 | WIPO | G06K 5/00 |
| WO 93/02424 | 2/1993 | WIPO | G06F 15/30 |
| WO 94/10649 | 5/1994 | WIPO | G06K 5/00 |

*Primary Examiner*—Karl D. Frech
*Attorney, Agent, or Firm*—L. Joy Griebenow; Baker & Botts L.L.P.

[57] ABSTRACT

The automated improved check processing system and method includes a data entry device (200, 202) for receiving checking account information (304, 306, 308) and a check amount (302) of a check (210, 300) provided for deposit in a transaction, which are electronically transmitted and stored in a database (204). A document identifier is automatically generated and also stored with the checking account information in the database (204). Further, the depositor's account information may also be read and stored in the database. A power encoder (208, 414) is then used to match the paper checks (210, 300) with the respective electronic checking account information and check amount so that the correct check amounts can be encoded onto the face of the checks. The power encoder may also spray endorse a depositor's account information on the check to facilitate returns processing (416). Cash management investment positions can also be planned and maximized in advance due to the early availability of the deposit information (418) through on-line access terminals.

35 Claims, 2 Drawing Sheets

AUTOMATED SYSTEM AND METHOD FOR IMPROVED CHECK PROCESSING

TECHNICAL FIELD OF THE INVENTION

This invention is related in general to the field of document handling systems. More particularly, the invention is related to an automated system and method for improved check processing.

BACKGROUND OF THE INVENTION

The typical check processing procedure in use today is a long and tedious process, which requires one or more processing days and multiple repetitive steps. The procedure includes many opportunities for errors to be introduced.

The typical check processing procedure is shown in FIG. 1 and begins, for example, at a bank teller window. The teller is given one or more checks for deposit by the customer, each check having a specific dollar amount or check amount. The teller totals the check amounts and credits the customer's account with the amount, as shown in block 100. At the end of the day, the total of all checks received that day by each teller may be totaled. The teller totals are combined to form a bank total.

The bank first encodes the check amounts on the checks, as shown in block 102. The encoding process is performed manually, with an operator physically handling each check, viewing the amount, and then keying it on the face of the check. The check amount is then encoded in magnetic ink on the face of the check in a predetermined field or location, such as the bottom right of the check in alignment with the MICR line. The encoding speed per operator is slow, typically 1,200 to 1,400 checks per hour. Because this processing step relies heavily on the human operator, who must process a large quantity of documents in a short time, it is prone to errors. The check amount may be misread due to poor penmanship and a number of other reasons or the amounts may be entered incorrectly. The encoded checks are then tallied and compared with the total on the deposit ticket. This process is commonly termed "proofing."

The encoded checks are then shipped to a central processing location for the "capturing" step, as shown in block 104. High speed reader/sorters process the checks by reading and sorting the checks according to information printed on the MICR (magnetic ink character recognition) line located at the bottom of the check. The MICR information on the check includes the bank number, account number, check serial number, in addition to the encoded check amount. The checks are read and sorted by bank or some other designation according to the transit and routing information also present in the MICR line. Approximately 1 to 1.5% of checks are rejected because the MICR line information is not readable. The rejected checks are manually handled and corrected. A balance of credits and debits is then computed. The sorted checks and a cash letter listing each check and their amounts are then sent to the institutions owning the accounts that the checks are drawn on in a collection and transit process.

The transit process delivers the checks to the bank having the accounts the checks are drawn on, at which place another capturing process commonly termed "inclearing" is performed, as shown in block 106. Inclearing ensures that the checks are actually drawing on that bank's accounts, the amounts are encoded on the checks, the correct settlement amount is given to the other banks, and that the correct amount is finally settled or posted out of the customer's account, as shown in block 108. The checks may then be returned to the checking account owner, as shown in block 110.

It may be seen from the foregoing that the traditional check processing procedure is a time-consuming and tedious process. Each time the check is handled or encoded, an opportunity for error is introduced. As a result, check processing is a very costly procedure for banks and businesses.

Further, banking institutions and businesses may engage in cash management practices that take advantage of the float period used to process the checks. These practices maximize their returns by keeping the money in high return investments until the very last moment when they must settle or fund their accounts for collection. When substantial money is involved, the benefits can be significant. Additionally, depending on the amount of funds available, decisions may be made to borrow funds overnight to maintain certain capital ratios with the Federal Reserve Bank. However, the information of what funds are available from deposited checks often is not available until late in the day or the next day after the checks are processed. It becomes desirable to plan cash management positions as early as possible to maximize the benefits.

SUMMARY OF THE INVENTION

Accordingly, there is a need for a system and method for improved check processing that eliminates repetitive and error-prone steps. As a result, the total check processing time and cost are reduced. Further, banking institutions and businesses involved in cash management practices are informed in advance of presentment what funds are available as a result of deposited checks. Returns processing also becomes a less costly step with the information needed to process returned checks readily available.

In accordance with the present invention, a system and method for automated improved check processing are provided which eliminates or substantially reduces the disadvantages associated with prior systems and processes.

In one aspect of the invention, an automated check processing system includes an input device receiving checking account information, a check amount of a check provided for deposit in a banking transaction at a banking institution, and a document identification number. A database is coupled to the input device for electronically receiving and storing the checking account information and check amount, the stored checking account information and check amount being referenceable by the document identification number. A power encoder electronically receives from the database the checking account information and check amount for transactions occurring over a predetermined transaction period, and further receives the paper checks provided for payment in the same transactions occurring over the same predetermined transaction period, so that the checks may be matched with the electronic checking account information and check amounts. The check amounts are then encoded on the matched checks.

In another aspect of the invention, a method for automated check processing provides for receiving checking account information and a check amount of a check provided in a transaction, automatically generating a document identification number for identifying the transaction, and electronically transmitting the checking account information, check amount, and document identification number to a database for storage therein. The checking account information and check amounts related to transactions occurring over a predetermined transaction period are then electronically downloading from the database to a power encoder, which matches the paper checks with the electronically downloaded checking account information and check amount and encodes the check amounts on respective matched checks.

In yet another aspect of the invention, a method for automated check processing provides for electronically recording and storing checking account information and check amounts of checks provided for deposit in transactions occurring over a predetermined transaction period at the time of each transaction, automatically generating a document identifier associated with each check transferred in each the transaction and storing the document identifier with the checking account information and check amount associated with each check, and then electronically matching the checks with the electronically recorded checking account information and check amounts. The check amounts are then encoded on respective matched checks.

BRIEF DESCRIPTION OF THE DRAWINGS

For a better understanding of the present invention, reference may be made to the accompanying drawings, in which.

DETAILED DESCRIPTION OF THE INVENTION

Figure 1:
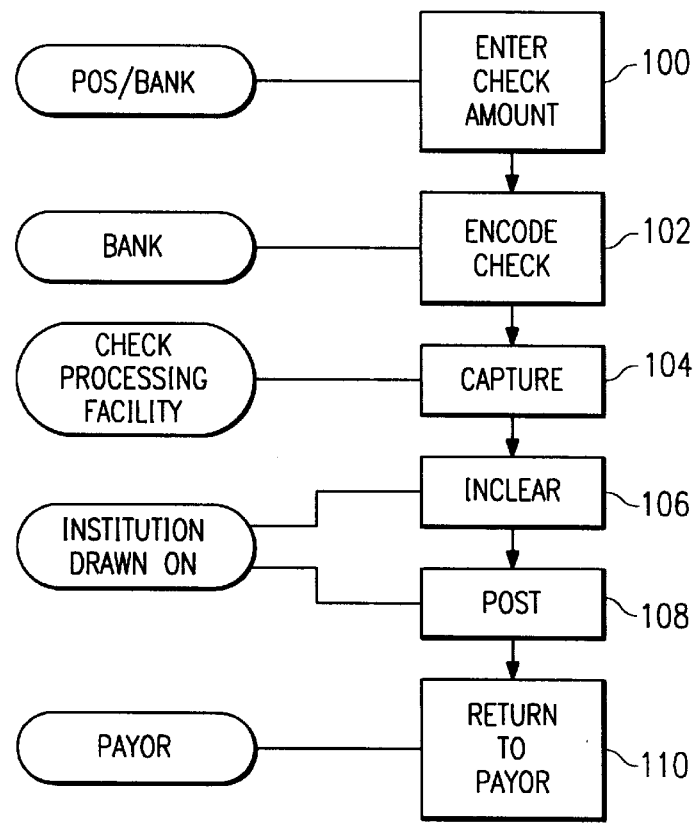
FIG. 1 is a simplified diagram of a typical back office check processing procedure.
Figure 2:
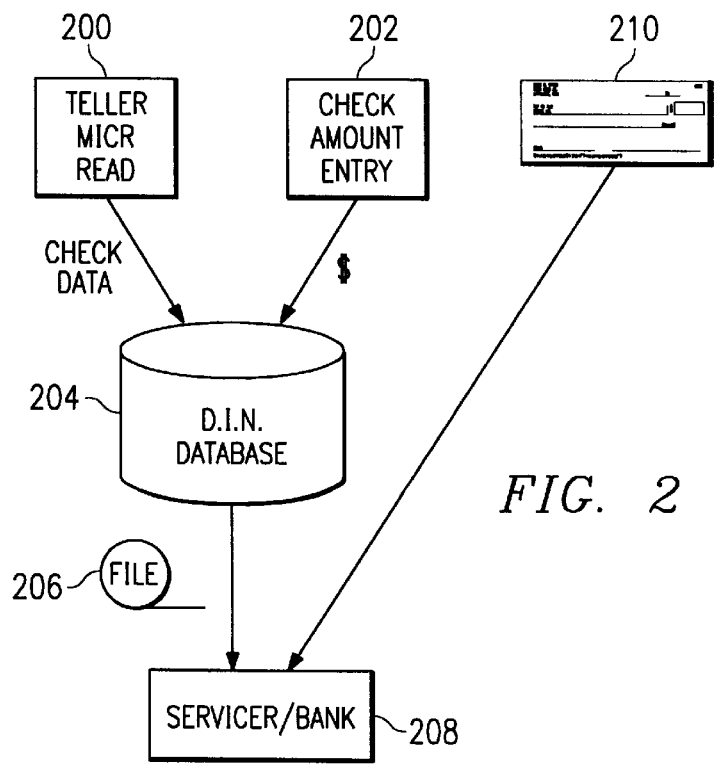
FIG. 2 is a simplified block diagram of a automated improved check processing system and method therefor constructed according to the teachings of the present invention.
Figure 3:
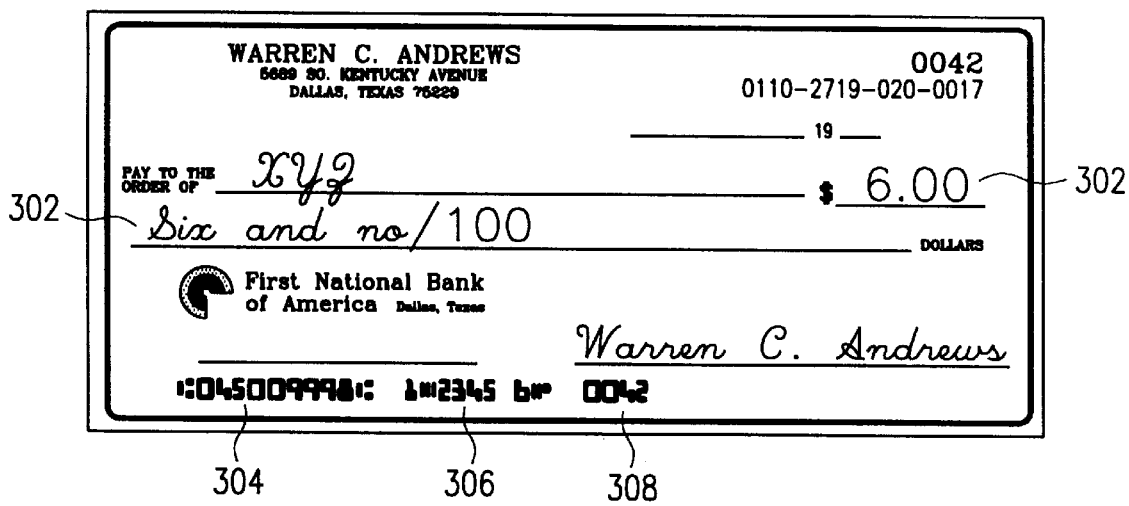
FIG. 3 is a representation of a check.
Figure 4:
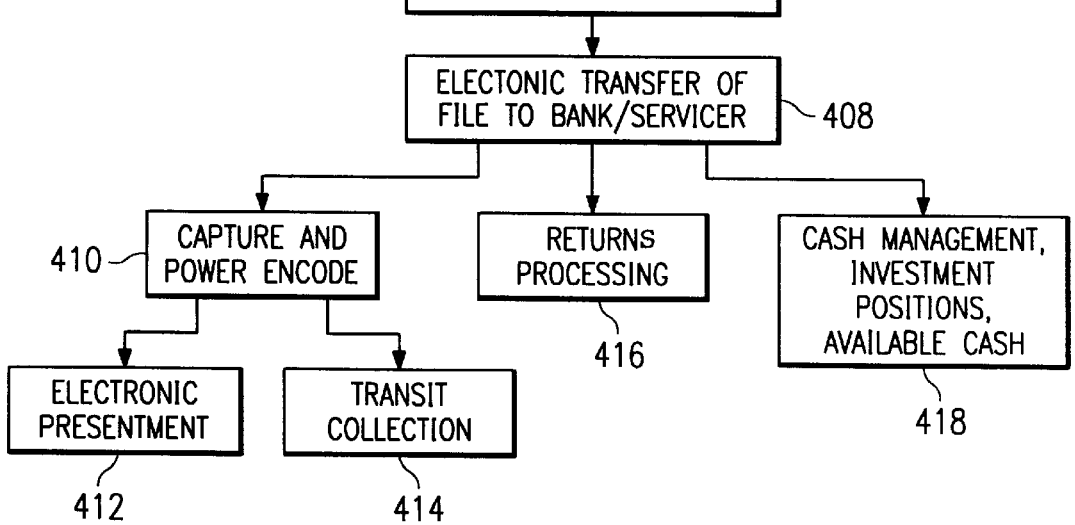
FIG. 4 is a flowchart of an automated improved check processing procedure according to the teachings of the present invention.

The preferred embodiment(s) of the present invention is (are) illustrated in FIGS. 2–4, like reference numerals being used to refer to like and corresponding parts of the various drawings.

FIGS. 2 and 4 are a block diagram and a flowchart of automated improved check processing system and method therefor, respectively, and both are referenced in the description below. Beginning at block 400 of FIG. 4, automated check processing begins by obtaining a check amount as written on the check being deposited by the customer, as shown in block 402. Check amount entry may be performed by the bank teller on a numerical keypad 202 (FIG. 2) or any other suitable data entry device. The check is also passed through a MICR reader 200 to read the checking account information pre-printed on the check, as shown in block 404. FIG. 3 shows a representation of a check 300, with the MICR line located on the bottom of the check. Numerals 304 are transit and routing information, numerals 306 are the checking account number, and numerals 308 are the check serial number. The check amount 302 is written in two fields on the face of the check. In addition, the depositor's account number, as shown on a deposit slip, is also read by MICR reader 200. Alternatively, the depositor's account number may be keyed in on a numerical keypad 202.

The checking account information, check amount, and depositor's account number are then transmitted electronically to a document identification number (D.I.N.) database 204 where they are stored, as shown in block 406. The checking account information, check amount, and depositor's account number are further augmented and referenced by the document identification number. The document identification number or identifier is generated automatically and may be composed of a combination of all or some of the transaction data, including the transaction date, branch number of the bank, teller identifier, and document sequence number. The document identification number is a unique identifier used to reference a specific check and is useful when questions arise about a particular transaction and for research.

The connection between MICR reader 200 and check amount entry device 202 to D.I.N. database 204 may be via a dedicated or switched telecommunications line. Although shown in FIG. 2 as separate entities, MICR reader 200 and check amount entry device 202 may be implemented as an integrated input device.

Throughout a predetermined transaction period, such as each day of operation, the data associated with all transactions taking place at the banking institution are transmitted at the time of presentment and recorded in D.I.N. database 204. At the end of the transaction period, all transaction check data 206 are then downloaded or otherwise transferred electronically to a central processing location of a bank or a servicer 208 contracted to perform check processing for that banking institution, as shown in block 408. Alternatively, the transaction data for a transaction period may be stored on-site at the bank branch and downloaded or transferred at the end of the transaction period to D.I.N. database 204 in one batch. The banking institution may also access D.I.N. database 204 on-line so that deposit information is readily available throughout the day.

In addition, the paper checks 210 associated to the same transaction period are also sent to the processing center or servicer 208. Check processing then performs the power encoding procedure by first searching in the downloaded data for the electronic record, including the D.I.N. and checking account information of each transaction, and matching the paper check. Subsequently, since the check amount is electronically available, the checks may be processed by the traditional capture process in which they are power-encoded with the check amounts, as shown in block 410. Additionally, the checks may be spray endorsed with the D.I.N. and the depositor's account number. Spray endorsement is typically done on the back of the checks.

The automated power encoding machinery first reads the MICR data on the paper check, searches the electronic transaction data in the file that was transmitted, and finds a match. The check amount in the electronic data is read and then encoded on the paper check in the proper field or location. Magnetic ink or an otherwise machine-readable medium is used to encode the check amounts. Automated machinery for matching and power encoding is commercially available and in use today in the remittance environment where checks are submitted with a statement for paying bills, such as mortgage, utility, and credit cards. Examples of the power encode machinery include the Banctec® UT1000 and BT5300, NCR® (National Cash Register®) 7780, and the UNISYS® DP500. The power encoding process is a highspeed process in which 600 to 1,000 checks may be processed per minute. The machines also sort the checks by destination so that electronic presentment 412 and transit collection 414 as known in the art may take place to complete the check processing procedure.

Returns processing 416 may also be performed using information transferred to the central processing location or servicer by using the depositor's account number electronically stored in D.I.N. database 204. Returns occur when the checking account a check draws on has insufficient funds to cover the check. The check is then returned to the depositor's bank. With the depositor's information available electronically and readily accessible, returns processing is simplified and the costs associated therewith are reduced.

In operation, the time-consuming and tedious step of proofing and manually encoding the checks with the check amounts is eliminated by the automated system and method of the present invention. Recall that the encoding process is manually performed at a speed of typically 1,200 to 1,400 checks per hour compared with the power encoding process at a speed of 36,000 to 60,000 checks per hour. Because the manual encoding step is eliminated, significant cost reduction is realized for the savings in labor, machinery, and office space. Errors that may be introduced at this step are also avoided. Further, returns processing is made easier due to the availability of depositor information in electronic form as well as on the paper checks. Further, the availability of early check deposit information is invaluable for cash management 418.

Cash management 418 is also made an even more valuable business practice because its effects are magnified by the early availability of information. Because transactional information is available much earlier in the day at the beginning of check processing rather than at the end of the process two days later, banking institutions and businesses are able to better plan their cash management and investment positions. For example, check routing for collection may be planned in advance and the transit and routing of certain checks may be prioritized to collect larger dollar items first. Overnight borrowing of federal funds to cover their capital positions may also be planned ahead of time because the amount of available cash is known earlier. The value of early knowledge and early planning is extremely important and cannot be underestimated.

Although the present invention and its advantages have been described in detail, it should be understood that various changes, substitutions and alterations can be made therein without departing from the spirit and scope of the invention as defined by the appended claims.

What is claimed is:

1. An automated check processing system, comprising:
an input station receiving MICR checking account information and a check amount of a check provided for deposit in a banking account, said MICR data being preprinted on said check;
a database coupled to said input station via a data communications link, for electronically receiving and storing said MICR checking account information and check amount; and
a power encoder electronically receiving from said database said MICR checking account information and check amount for transactions occurring over a predetermined transaction period, and further receiving checks provided for payment in said same transactions occurring over said same predetermined transaction period, said power encoder operable to read MICR checking account information from said checks, said power encoder matching stored MICR checking account information for a particular transaction from said database to MICR checking account information read from a particular check and obtaining a corresponding check amount from the database for that transaction, said power encoder operable to encode said check amount on each of said matched checks.

2. The system, as set forth in claim 1, wherein said input station comprises a MICR reader for reading MICR data line on said check.

3. The system, as set forth in claim 1, wherein said input station comprises a MICR reader for reading MICR data line on a deposit slip being provided with said check, said deposit slip having a depositor's account number preprinted thereon.

4. The system, as set forth in claim 1, wherein said input station comprises at least a numerical keypad for entering said check amount.

5. The system, as set forth in claim 1, wherein said checking account information includes a routing and transit number, a checking account number, and a check serial number.

6. The system, as set forth in claim 1, wherein said input station has an integrated input device for reading MICR data and receiving check amount data.

7. The system, as set forth in claim 1, wherein said power encoder encodes said check amount on said matched check in a machine-readable medium.

8. The system, as set forth in claim 1, wherein said power encoder encodes said check amount on said matched check in a magnetic ink.

9. The system, as set forth in claim 1, wherein said power encoder spray endorses said depositor's account number on said matched check.

10. The system, as set forth in claim 1, wherein said input station is a teller station where a teller manually enters said check amount.

11. A method for automated check processing, comprising the steps of:
receiving, at a teller station, MICR checking account information and a check amount of a check;
electronically associating said MICR checking account information with said checking amount and transmitting said MICR checking account information and said check amount to a database for storage therein;
electronically downloading MICR checking account information and check amounts related to transactions occurring over a predetermined transaction period from said database to a power encoder;
transmitting said checks provided for payment in transactions occurring over said same predetermined transaction period to said power encoder;
reading said MICR checking account information from said checks;
using the MICR checking account information to match said checks with said electronically downloaded MICR checking account information; and
encoding said check amounts on respective matched checks.

12. The method, as set forth in claim 11, further comprising the step of automatically encoding said document identification number for identifying said transaction, said encoding being performed after said transmitting step.

13. The method, as set forth in claim 11, wherein said electronically transmitting step comprises the step of transmitting said checking account information and check amount via a telecommunications line.

14. The method, as set forth in claim 11, wherein said checking account information receiving step comprises the step of reading pre-printed MICR depositor's account information on a deposit slip submitted with said check.

15. The method, as set forth in claim 11, wherein said check amount receiving step comprises the step of electronically entering said check amount.

16. The method, as set forth in claim 11, wherein said checking account information receiving step comprises the steps of machine-reading a routing and transit number, a checking account number, and a check serial number pre-printed on said check.

17. The method, as set forth in claim 11, wherein said checking account information receiving step comprises the step of reading pre-printed MICR line data on said check.

18. The method, as set forth in claim 17, wherein said matching step comprises the steps of:
  reading said MICR line data on said check; and
  searching said downloaded checking account information for a match with said MICR line data.

19. The method, as set forth in claim 17, wherein said matching step comprises the steps of:
  reading said MICR line data on said check;
  searching said downloaded checking account information for a match with said MICR line data;
  obtaining a corresponding depositor's account information; and
  spray endorsing said check with said depositor's account information.

20. The method, as set forth in claim 19, further comprising the step of processing a returned check using said electronically stored depositor's account information.

21. The method, as set forth in claim 19, further comprising the step of spray endorsing said depositor's account information on said check.

22. The method, as set forth in claim 11, further comprising the step of accessing information stored in said database on-line.

23. The method, as set forth in claim 22, further comprising the step of planning cash management investment positions using information stored in said database.

24. A method for automated check processing, comprising the steps of:
  electronically recording and storing preprinted MICR checking account information and check amounts of checks provided for deposit in transactions occurring over a predetermined transaction period at the time of each transaction;
  using the MICR checking account information preprinted on said checks to electronically match said checks with said electronically recorded checking account information to obtain corresponding check amounts for respective matched checks; and
  electronically encoding said check amounts on respective matched checks.

25. The method, as set forth in claim 24, further comprising the step of automatically generating a document identifier associated with each check transferred in each said transaction and storing said document identifier with said checking account information and check amount associated with each check.

26. The method, as set forth in claim 25, wherein said step of recording and storing is preceded by the step of manually entering said check amount at a teller station.

27. The method, as set forth in claim 24, further comprising the step of reading pre-printed MICR line data on said check.

28. The method, as set forth in claim 27, wherein said electronically matching step comprises the steps of:
  reading said MICR line data on said check; and
  searching said downloaded checking account information for a match with said MICR line data.

29. The method, as set forth in claim 27, wherein said electronically matching step comprises the steps of:
  reading said MICR line data on said check;
  searching said downloaded checking account information for a match with said MICR line data;
  obtaining a corresponding depositor's account information; and
  spray endorsing said check with said depositor's account information.

30. The method, as set forth in claim 24, further comprising the step of reading pre-printed MICR depositor's account information on a deposit slip submitted with said check.

31. The method, as set forth in claim 24, further comprising the steps of machine-reading a routing and transit number, a checking account number, and a check serial number pre-printed on said check.

32. The method, as set forth in claim 31, further comprising the step of processing a returned check using said electronically stored depositor's account information.

33. The method, as set forth in claim 24, further comprising the step of transmitting said checking account information and check amount via a telecommunications line.

34. The method, as set forth in claim 24, further comprising the step of accessing information stored in said database on-line.

35. The method, as set forth in claim 34, further comprising the step of planning cash management investment positions using information stored in said database.

* * * * *